United States Patent [19]

Burkhardt et al.

[11] Patent Number: 4,631,404
[45] Date of Patent: Dec. 23, 1986

[54] POSITION MEASURING SYSTEM

[75] Inventors: Horst Burkhardt, Truchtlaching; Alfons Ernst; Holmer Dangschat, both of Traunreut; Horst Wogatzke, Neuss, all of Fed. Rep. of Germany

[73] Assignee: Johannes Heidenhain GmbH, Traunreut, Fed. Rep. of Germany

[21] Appl. No.: 724,189

[22] Filed: Apr. 17, 1985

[30] Foreign Application Priority Data

Apr. 21, 1984 [DE] Fed. Rep. of Germany ....... 3415091
May 30, 1984 [DE] Fed. Rep. of Germany ....... 3420187
Oct. 23, 1984 [DE] Fed. Rep. of Germany ....... 3438750
Mar. 19, 1985 [DE] Fed. Rep. of Germany ....... 3509838

[51] Int. Cl.$^4$ ............................................. H01J 3/14
[52] U.S. Cl. ............................ 250/237 G; 33/125 C; 250/231 SE
[58] Field of Search ............. 33/125 A, 125 C, 125 R, 33/147 N; 250/231 SE, 237 G; 324/175; 356/395

[56] References Cited

U.S. PATENT DOCUMENTS 4,326,128 4/1982 Klein ........................... 250/231 SE
4,403,859 9/1983 Ernst ........................... 250/237 G X
4,519,140 5/1985 Schmitt ........................... 33/125 C
4,554,741 11/1985 Affa ........................... 250/237 G X Primary Examiner—Eugene R. LaRoche
Assistant Examiner—Steven J. Mottola
Attorney, Agent, or Firm—Willian Brinks Olds Hofer Gilson & Lione Ltd.

[57] ABSTRACT

A position measuring system includes for the determination of a reference position at least one additional reference scanning unit which is shiftable relative to the measuring scale, independently of the measuring scanning unit and the measuring scale, and accordingly of the machine components connected to the measuring scanning unit and the measuring scale. The measuring scale carries an incremental graduation and a reference mark, and the measuring scanning unit and the reference scanning unit carry indicator blocks which on coincidence form a zero indicator. In order to determine the reference position, the reference marks and the zero indicator are scanned successively, but in arbitrary sequence, and their differential spacing is determined with the aid of a graduation of the reference scanning unit.

22 Claims, 16 Drawing Figures

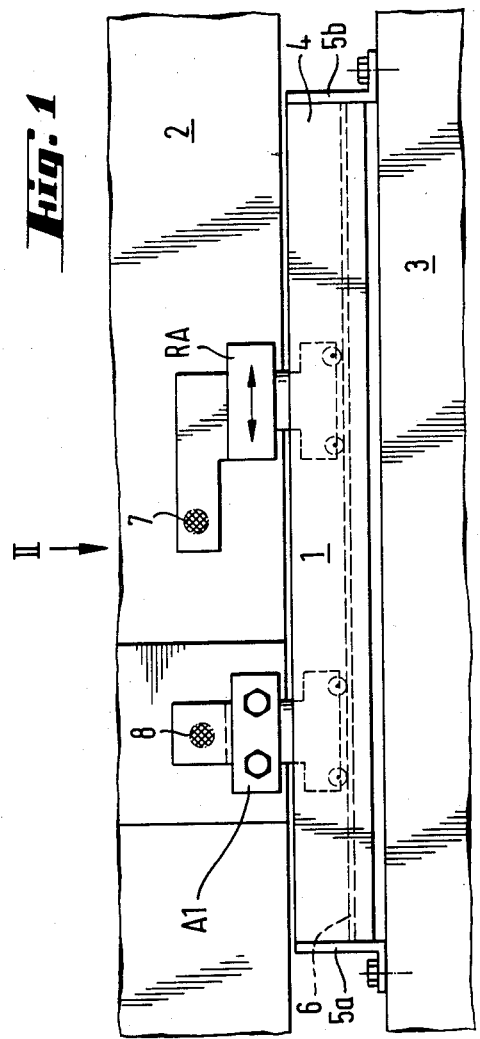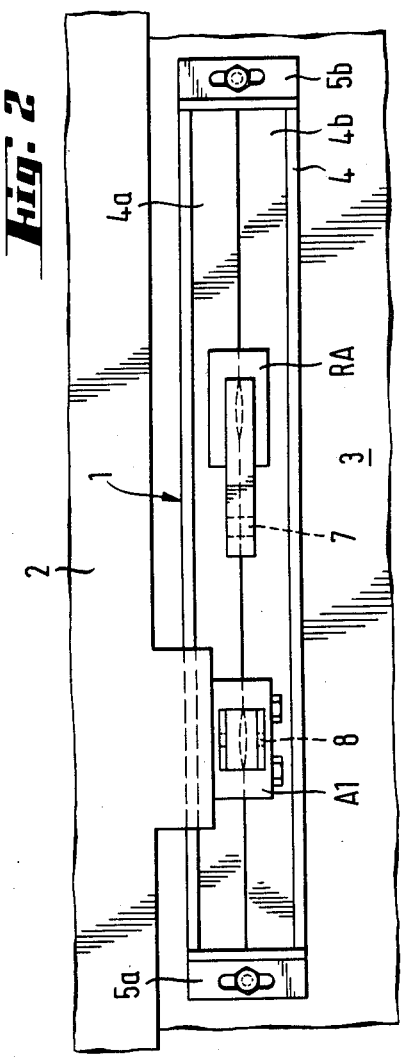

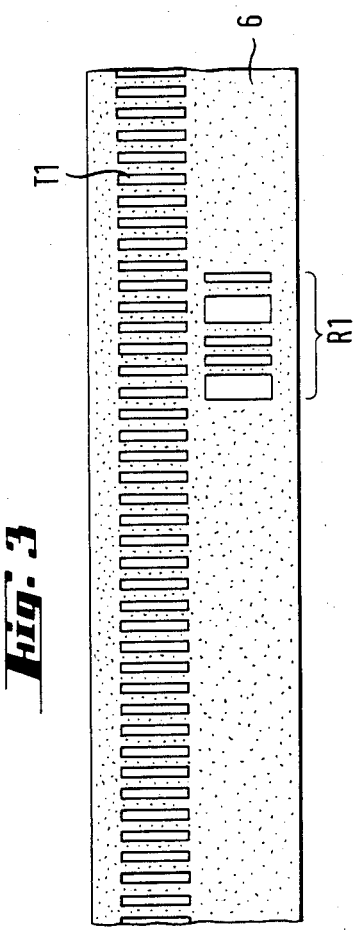
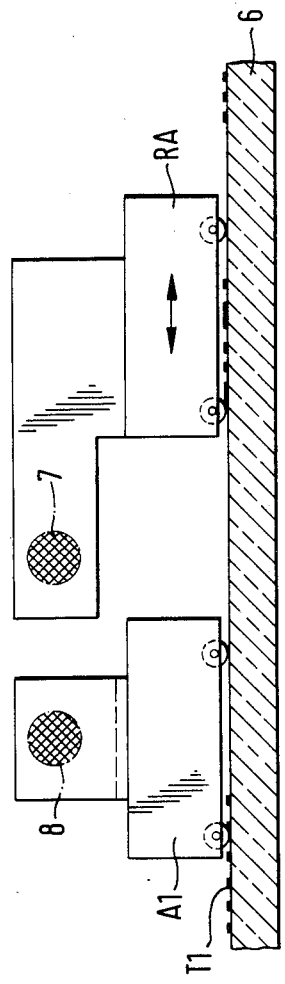

POSITION MEASURING SYSTEM

BACKGROUND OF THE INVENTION

This invention relates to systems for measuring the relative position of first and second objects movable relative to one another, of the type comprising at least one measuring graduation carrier connected to the first object, a measuring incremental graduation defined by the measuring graduation carrier, at least one measuring scanning unit connected to the second object to scan the measuring incremental graduation, and means for defining at least one reference position at a selected absolute position with respect to the measuring incremental graduation.

In such position measuring systems it is a known practice in order to determine a reference position to drive either the machine components or the measuring system components which are movable relative to one another out of a starting position up to a reference mark. Once properly positioned, a position value appropriate for the reference mark is determined and stored, or alternately the reference mark is used to identify a zero position. In this way, an incremental measuring system can be calibrated as to absolute position.

Such a calibration process is possible with incremental length or angle measuring systems such as that described in German Patent DE-PS No. 19 64 381. This calibration process, however, requires unimpeded relative movability of the two objects to be measured, since the components of the measuring system are firmly joined with these objects and thus these objects must be shifted in common with the measuring system components to the reference mark.

German DE-OS No. 16 73 887 describes a measuring system for a machine, which permits a reference position to be determined in the event that the machine slide piece is clamped fast to the machine bed. First the slide piece must be driven into the position that is later to be declared the reference position for zero. Then the slide piece is clamped fast to the machine bed. Thereafter the scanning plate of the measuring arrangement is driven relative to the scale until the reference mark is reached. On reaching the reference mark the electronic counter of the measuring system is set to the value zero. The clamping for the machine slide piece can then be released and the slide piece can be driven to the desired position. The position of the reference mark therefore defines the reference position for further operating cycles.

This prior art process for determining a reference position is utilized before the working processes proper are begun. This approach is no longer suitable however in the event working operations have already begun, as for example when operations in progress are interrupted and the reference position must be regained. Such an interruption of a running operation can occur through a power failure for example. In the case of a manipulating automatic unit such as is generally referred to as an industrial robot, in the event of a power failure the robot remains standing in its momentary position. The measuring value referred to the original reference position is lost however due to the power failure, and the measuring operation is interrupted. In order to continue the interrupted working process, the reference position must be regained. A return movement of the robot out of its momentary position into the original starting position is as a general rule not possible. This is because a tool being manipulated by the robot may for example be in engagement with a work piece at the time of power interruption.

SUMMARY OF THE INVENTION

The present invention is directed to an improved position measuring system of the general type described initially above which overcomes the disadvantages of known systems and makes it possible, after the loss of position information, to reproduce a reference position without movement of the objects to be measured, even though they occupy unknown momentary positions.

According to this invention, a measuring system of the type described initially above is provided with at least one reference scanning unit for scanning the at least one reference position. This reference scanning unit is mounted to move independently of the measuring scanning unit, the first object and the second object. The reference scanning unit comprises means for scanning the at least one reference position. In addition, means are provided for determining the distance between a scanned one of the reference positions and the measuring scanning unit in order to determine the absolute position of the measuring scanning unit with respect to the scanned reference position.

The present invention provides important advantages in that it permits the reproduction of a reference position after interrupted measurements and movements out of known momentary positions, without requiring movement of the objects to be measured. Furthermore, this is all accomplished in a remarkably simple and rapid manner. For example, when one of the objects to be measured takes the form of a tool, in the event of an interruption of the measuring process and the processing operation, the tool can remain in engagement on the work piece, so that after power is restored and the reference position is redetermined, the interrupted processing operation can immediately be resumed. A withdrawal of the tool from the point of engagement on the work piece and a renewed accurate driving of the tool up to this point of engagement is time consuming and difficult and can lead to damage to the work piece. Furthermore, when the present invention is applied to industrial robots, program controlled checkings of the particular reference positions are possible between individual work runs. In this way, the operating security of such systems can be considerably improved. Further advantageous features of the invention are set forth in the dependent claims.

The invention itself, together with further objects and attendant advantages, will best be understood by reference to the following detailed description, taken in conjunction with the accompanying drawings.

BRIEF DESCRIPTION OF THE DRAWINGS

FIG. 1 is a side view of a length measuring system mounted to two machine components to be measured, which incorporates a first preferred embodiment of this invention.

FIG. 2 is a plan view of the measuring system of FIG. 1.

FIG. 3 is a partial enlarged plan view of a measuring scale included in the embodiments of FIGS. 1 and 2.

FIG. 4 is a schematic representation of a side view of the measuring scale of FIG. 3 showing two schematically drawn scanning units.

DETAILED DESCRIPTION OF THE PRESENTLY PREFERRED EMBODIMENTS

Figure 5:
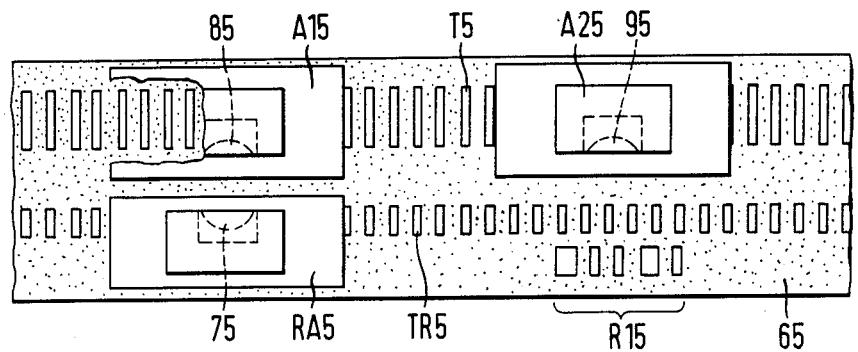
FIG. 5 is a partial plan view of a measuring scale which includes two incremental graduations and a reference mark.

Turning now to the drawings, FIG. 1 shows a somewhat schematic representation of a position measuring system 1 which incorporates a first preferred embodiment of this invention. FIG. 1 is a schematic representation restricted to the details necessary to understand this embodiment of the invention. The position measuring system measures the relative position of two objects 2, 3 with respect to one another. These objects 2, 3 can be, for example, the bed and slide piece of a machine (not shown) such as a machine tool, for example.

A housing 4 is fastened to the slide piece 3 by means of angle pieces 5a, 5b. A measuring scale 6 is mounted within the housing 4 in a known manner. This measuring scale 6 carries an incremental graduation T1 which likewise in a known manner is scanned by a measuring scanning unit A1. The scanning unit A1 is solidly joined with the bed 2 of the machine such that relative movement between the bed 2 and the slide piece 3 causes relative movement between the scanning unit A1 and the measuring scale 6. Since the measuring scale 6 carries the incremental measuring graduation T1, the position of the moving slide piece 3 with respect to the stationary bed 2 can constantly be determined during operation of the scanning unit A1. Signals generated by the scanning unit A1 in response to relative movement of the incremental graduation T1 are detected in an evaluating unit (not shown) and displayed as a path or position value. The nature of the incremental graduation T1 will be described in greater detail below.

According to this invention, in addition to the scanning unit A1 there is provided an additional reference scanning unit RA, which is shiftable relative to the measuring scale 6, independently of the bed 2 and the slide piece 3. This reference scanning unit RA can be used to determine at any time the position of the scanning unit A1 with respect to a reference point of the measuring scale 6. The reference point is determined by a reference mark R1, the position of which with respect to the incremental graduation T1 of the measuring scale 6 is absolutely established. This reference point determination is described below in conjunction with the aid of FIGS. 3 and following.

FIG. 2 shows a plan view of the measuring system of FIG. 1. As shown in FIG. 2 the housing 4 is sealed off on its upper side by means of sealing elements 4a, 4b. The scanning units A1, RA include followers which extend through a slot in the housing 4. This slot is sealed by the sealing elements 4a, 4b. The followers act to spread the sealing elements 4a, 4b apart, and the cross section of the followers resembles that of a two-edged sword such that the sealing elements 4a, 4b seal the slot around the followers.

FIG. 3 shows an enlarged partial plan view of the measuring scale 6. This measuring scale 6 is made of glass and is provided with a layer that is impermeable to radiation. Typically, radiation used in such measuring systems is in the optical range, although this invention is not to be restricted to electro-optical position measuring systems.

With the aid of photolithographic processes an incremental graduation T1 is applied to the measuring scale 6, in a manner well known to those skilled in the art. At a point defined as a reference point there is arranged on the measuring scale 6 a reference mark R1. Obviously, a plurality of reference marks can be provided if desired.

The incremental graduation T1 is scanned in a known manner by the measuring scanning unit A1. FIG. 4 will be used to explain how the reference position is determined in the embodiment of FIGS. 1 through 4 in a manner according to this invention.

In FIG. 4 the measuring scale 6 is shown in side view. The measuring scanning unit A1 scans the incremental graduation T1. In FIG. 4 the measuring scanning unit A1 is positioned at an arbitrary rest position along the measuring scale 6. This rest position can be caused, for example, by an interruption of the power supply to the machine. Such a power interruption also causes position values developed by an incremental measuring system to be lost.

In order to recover these position values it is necessary in the state of the art discussed in the opening paragraphs of this specification that the reference mark coincide with a corresponding scanning field of the scanning unit in order to allow generation of a reference pulse that sets the evaluating arrangement on a predetermined value such as zero. Once such a reference pulse is obtained the slide piece can again be positioned. The disadvantages resulting from this procedure have been discussed above.

According to this invention, the reference position can be regained, even when the slide piece 3 and the measuring scale 6 occupy an unknown position with respect to the bed 2 and the scanning unit A1, without relative movement between any of these elements. According to this embodiment of the invention, in order to determine the position of the scanning unit A1 relative to the reference mark R1 and therewith of the slide piece 3 relative to the bed 2, the distance of the reference mark R1 from the scanning unit A1 is determined. For this purpose, the additional reference scanning unit RA is driven relative to the measuring scale 6, either manually or by means of an automatic drive system (not shown). As shown in FIG. 4, both the reference scanning unit RA and the measuring scanning unit A1 have indicator blocks 7, 8. When the indicator blocks 7, 8 are brought into coincidence, they form a so-called zero indicator. A zero indicator can have the most diverse form with regard to structure. For example, a scanned reference mark is in a certain sense a zero indicator.

After one of the zero indicators (the reference mark R1 or the zero indicator formed by the two indicator blocks 7, 8) has been overrun, the evaluating unit is set on a certain value such as zero. Thereafter, the reference scanning unit RA is driven in the direction of the other zero indicator, and the reference scanning unit RA determines the number of graduation increments scanned. The total number of graduation increments scanned by the reference scanning unit RA between the reference mark R1 and the point of coincidence between the two indicator blocks 7, 8 is summed up in the evaluating unit. When the other zero indicator (R1 or 7, 8) is overrun, this counting of the evaluating unit is stopped and there is displayed as a reference value the distance of the first reference mark R1 from the zero indicators 7, 8. In this way, the absolute position of the measuring scanning unit A1 is determined, and a reference position is reproduced, without requiring movement of any of the machine components.

Of course, it will be apparent that the reference scanning unit RA must be constructed in correspondence to the requirements. As shown in the example, the reference scanning unit can be positioned within the position measuring system 1. In alternate embodiments the reference scanning unit RA can be guided outside the position measuring system 1 directly on the machine.

FIG. 5 shows a measuring scale 65 similar to that of FIG. 3. This measuring scale 65 defines an incremental graduation T5 and an additional incremental graduation TR5. This additional incremental graduation TR5 may but does not have to have the same grid constant as the incremental graduation T5. In the event that both the incremental graduations T5 and TR5 have the same grid constant, it is preferable to provide instead of two separate incremental graduations T5, TR5, a single broad incremental graduation.

In this embodiment, in addition to the measuring scanning unit A15, additional measuring scanning units A25 are provided for scanning the incremental graduation T5. Of course, more than two scanning units for the incremental graduation T5 can be provided if desired. The use of several measuring scanning units to scan a common incremental graduation is well known in conjunction with very long machines that drive several machine slide pieces in an axis, independently of one another. Accordingly, each of the scanning units A15, A25 has a different respective reference position with respect to the graduation zero point or the reference mark R15. In this embodiment, each of the scanning units A15, A25 includes a separate respective indicator block 85, 95 of its own. With the aid of a correspondingly switched evaluating unit, the distance from the graduation zero point or the reference mark R1 for each of the scanning units A15, A25 can be obtained in the manner described above.

It also lies within the scope of this invention to provide several reference marks on the measuring scale if the travel path for the reference scanning unit RA5 is to be kept short, or if a separate reference mark is to be allocated to each of the scanning units A15, A25. In this event, it is preferable to encode each of the individual reference marks in order to allow the position of each of the individual reference marks with respect to the graduation zero point to be read and decoded by the reference scanning unit RA5.

Figure 6:
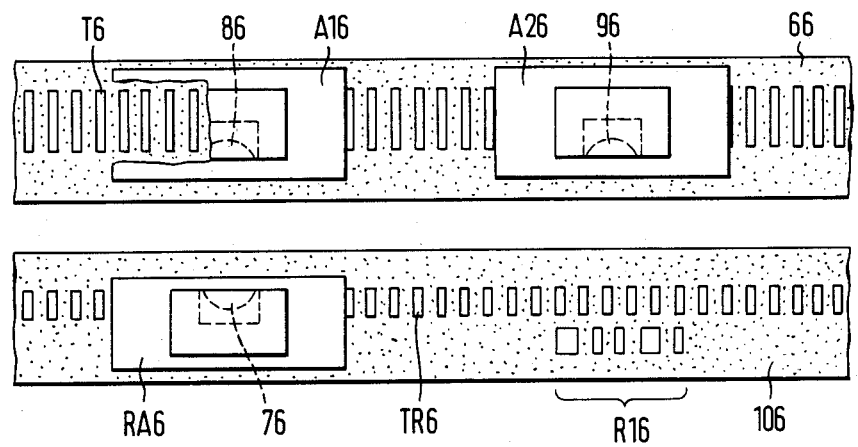
FIG. 6 is a partial plan view of a measuring scale which defines a first incremental graduation and an adjacent graduation carrier which defines a second incremental graduation and a reference mark.

FIG. 6 shows a particularly advantageous embodiment of this invention. In FIG. 6 an incremental graduation T6 is arranged on a measuring scale 66 and is scanned by measuring scanning units A16, A26. The measuring scale 66 includes no reference mark and is therefore an incremental position measuring system of the simplest construction. The measuring scale 66 can be encapsulated in a housing if desired, but this is not a prerequisite in this or any other of the embodiments described above.

The reference position of the measuring scanning units A16, A26 with respect to the graduation zero point is determined with the aid of a further position measuring system that has a measuring scale 106 of its own with an incremental graduation TR6 and a reference mark R16, which are scanned by a reference scanning unit RA6. The two measuring scales 66, 106 or the two corresponding position measuring systems are mounted on the machine in such a way that the reference mark R16 of the measuring scale 106 is precisely positioned with respect to the graduation zero point of the incremental graduation T6 of the other measuring scale 66. The scanning components A16, A26 as well as the reference scanning unit RA6 likewise each include a respective indicator block 86, 96, 76. The manner of determining the reference point is the same in this embodiment as in the method described above. In order to avoid reiteration, this method will not be repeated here.

The embodiment of FIG. 6 provides the important advantage that the position measuring system 1 of this invention can be constructed of two simple, standardized measuring systems, of which only one has to include a reference mark that is absolutely positioned with respect to the graduation of the other. By proper adjustment of relative position, this requirement is readily met.

Figure 7:
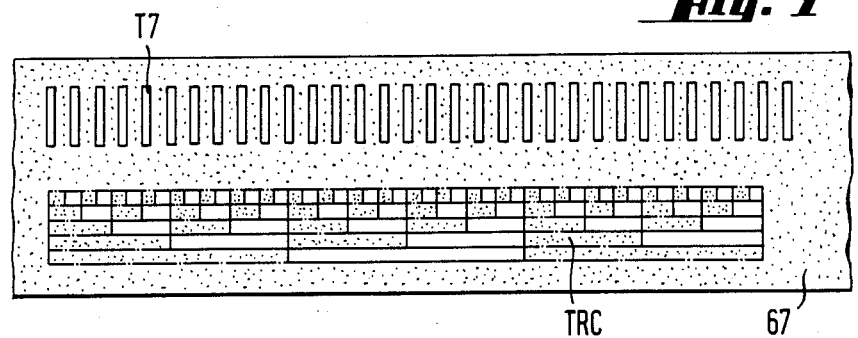
FIG. 7 is a partial plan view of a measuring scale which includes both an incremental graduation and a reference code graduation.

FIG. 7 shows yet another embodiment of this invention, in which the separate graduation is constructed as a reference code graduation TRC. Instead of an incremental graduation including a reference mark to define the reference position, in this embodiment a so-called absolute graduation is used as a reference code graduation TRC alongside the incremental graduation T7 on the measuring scale 67 used for the measurement operation proper. Of course, the reference scanning unit should be correspondingly constructed to scan the reference code graduation TRC. In this embodiment the absolute position with respect to the zero point of the reference code graduation code TRC is readable every time immediately by the evaluating unit (not shown), when the indicator block of the scanning unit for the incremental graduation T7 coincides with the indicator block of the scanning unit for the reference code graduation TRC.

Figure 8:
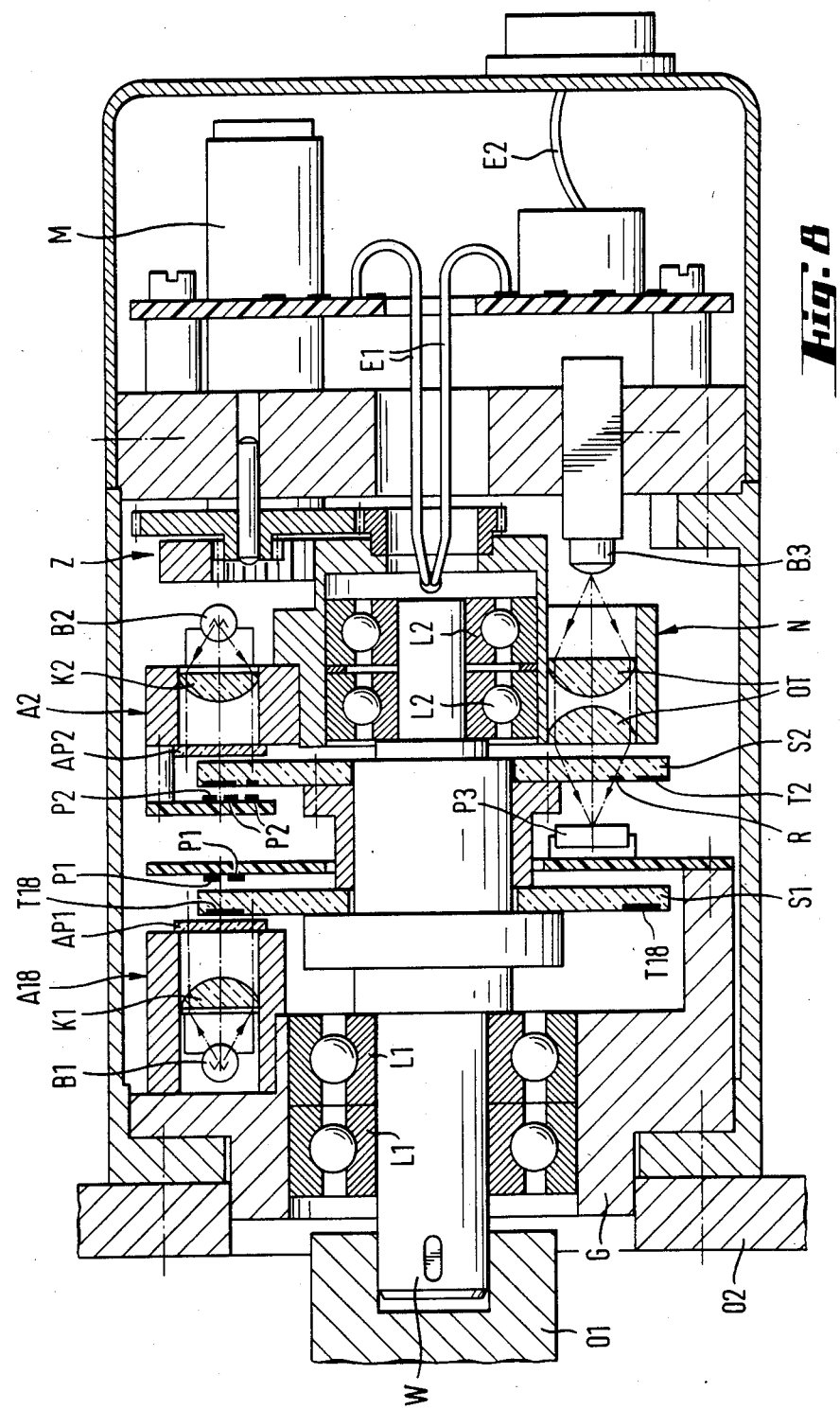
FIG. 8 is an axial sectional view of an angle measuring system which incorporates a second preferred embodiment of this invention.

FIG. 8 shows an incremental angle measuring system which incorporates yet another embodiment of this invention. In FIG. 8 the measuring system includes a housing G which is fastened to a second object O2 to be measured. For example, this second object O2 may constitute a frame or housing of an industrial robot (not shown). A shaft W is rotatably mounted by means of first bearings L1 in the interior of the housing G. A first index plate S1 with a first incremental graduation T18 is mounted to the shaft W. This first incremental graduation T18 is scanned photoelectrically by a first scanning unit A18 fastened to the housing G. This scanning unit A18 includes a first luminating unit B1, a first condenser K1, a first scanning plate AP1 which defines two first graduation scanning fields (not shown) as well as two first photo elements P1. In this embodiment the first incremental graduation T18 takes the form of a radial grid consisting of alternating photopermeable and photo-impermeable strips, suitable for use in the transmitted light measuring process. The first scanning plate AP1 includes two graduation scanning fields for scanning the first incremental graduation T18 of the first index plate S1. These two scanning fields are displaced with respect to one another by a quarter of the graduation period of the first incremental graduation T18, in order to allow discrimination of the direction of rotation of the index plate S1. The graduations of the two first graduation scanning fields agree with the first incremental graduation T18, and a corresponding photosensor P1 is aligned with each of the first graduation scanning fields. The shaft W extending from the housing G is connected with a first object O1 to be measured, which may, for example, take the form of an arm of an industrial robot.

During the measuring process proper, rotation of the shaft W and thereby of the first index plate S1 causes the first incremental graduation T18 to be rotated relative to the two first graduation scanning fields on the first scanning plate AP1 secured to the housing G. Light emanating from the first luminating unit B1 is modulated by the graduations of the first incremental graduation T18 and the two first graduation scanning fields as they move relative to one another. This modulated light falls upon the associated two first photosensors P1, which generate periodic analog signals phase shifted through 90° with respect to one another. These periodic analog signals are transformed into pulses in an evaluating unit (not shown) of the angle measuring system. These pulses are fed to a counter of the evaluating unit which counts the pulses to determine a position value that can be displayed in digital form in a display unit or can be directly conducted to a numerical control arrangement of the industrial robot.

A second index plate S2 is also fastened to the shaft W concentrically with the first index plate S1. This second index plate S2 defines a second incremental graduation T2 and a reference mark R which is absolutely positioned with respect to the first incremental graduation T18. The second incremental graduation T2 and the reference mark R on the second index plate S2 are photoelectrically scanned by a second scanning unit A2 which includes a second illuminating unit B2, a second condensor K2, a second scanning plate AP2, as well as three second photosensors P2. This second scanning unit A2 is rotatably mounted in the housing G on the shaft W by means of second bearings L2 such that the second scanning unit A2 is rotatable relative both to the second index plate S2 and to the housing G.

Two second graduation scanning fields (not shown) are included on the second scanning plate AP2 of the second scanning unit A2 to scan the second incremental graduation T2 of the second index plate S2. In order to discriminate direction of rotation of the second scanning plate AP2, these two second graduation scanning fields are offset with respect to one another by a quarter of the graduation period of the associated second incremental graduation T2. The graduations of the two second graduation scanning fields correspond with the second incremental graduation T2. A respective second photosensor P2 in the second scanning A2 is associated with each of the two second graduation scanning fields.

The reference mark R of the second index plate S2 consists of a line group with an irregular line distribution. A reference mark scanning field with an identical line distribution is included in the second scanning plate AP2 of the second scanning unit A2. A second photosensor P2 is included in the second scanning unit A2 to sense light passing through the reference mark scanning field on the second planning plate AP2.

A photoelectric zero sensor N is mounted in the housing G. This photoelectric zero sensor N includes a third illuminating unit B3 and a third photosensor P3. A reproduction optical system OT is mounted to the second scanning unit A2 rotatably with respect to the shaft W as an indicator block. On rotation of the second scanning unit A2 to a predetermined position in which the reproduction optical system OT is interposed between the third illuminating unit B3 and the third photosensor P3, the reproduction optical system OT focuses light emanating from the third illuminating unit B3 onto the third photosensor P3, thereby causing the third photosensor P3 to generate a zero signal that is characteristic of the predetermined absolute position of the rotatable second scanning unit A2 with respect to the housing G.

As previously mentioned, it is of great importance in an incremental position measuring system to determine at the beginning of a measurement a reference position for the first index plate S1, which serves as a starting position for the measurement and which can be reproduced if necessary after a malfunction.

In the following discussion it will be assumed that before the start of a measurement or in the event of an interruption during a measurement, the objects O1, O2 to be measured are at a standstill. As mentioned above, in the event of a current failure, the position measuring value of the position measuring system is lost. In the event the two objects O1, O2 are at a standstill, the first index plate Sl will be in a fixed position, and the position of the graduation zero point relative to the housing G will not be known.

The momentary position of the first index plate S1 with respect to the housing G must be determined in order to obtain the desired reference position. For this purpose, the embodiment of FIG. 8 is used in a calibrating mode of operation in which the second scanning unit A2 together with the reproduction optical system OT of the photoelectric zero sensor N is set in rotation by a motor M secured to the housing G. This motor M is coupled to the second scanning unit A2 by a gear train Z. Assuming the reproduction optical system OT of the zero sensor N passes into coincidence with the third illuminating unit B3 and the third photo element P3, the third photosensor P3 generates a zero signal that sets the counter of the evaluating unit to the value zero and simultaneously starts the counter. From this point of time onward, the second incremental graduation T2 of the stationary second index plate S2 is scanned by the two second graduation scanning fields on the rotating second scanning plate AP2. The periodic analog signals generated by the associated second photosensors P2 are evaluated and the resulting counting pulses are fed to the counter.

After the start of the counter and the commencement of counting of the graduation increments of the second incremental graduation T2, at some point the reference mark R of the stationary second index plate S2 is scanned by the associated reference mark scanning field on the rotating second scanning plate AP2. Scanning of the reference mark R causes a signal to be generated by the associated second photosensor P2 of the second scanning unit A2, which signal causes the counting of the evaluating unit to be stopped. The counting value determined in the counter for the shifting path of the second scanning unit A2 is an indication of the angle of rotation between the zero sensor N and the reference mark R on the second index plate S2. Thus, the counting value directly indicates the absolute position value which the first index plate S1 and the second index plate S2 momentarily occupy with respect to the housing G. This is because the reference mark R directly represents the graduation zero point of the associated first incremental graduation T18 on the first index plate S1. Once both the zero signal has been generated by the third photosensor P3 and the reference signal has been generated by the second photosensor P2, the calibration process is completed and the motor M is brought to a standstill.

From the point of time of the scanning of the reference mark R on the second index plate S2 onward, the counter for the measuring process proper can again be fed by the counting pulses which are generated in the rotation of the first index plate S1 with respect to the housing G through the scanning of the first incremental graduation T18 by means of the two first graduation fields on the first scanning plate AP1 and by means of the two associated first photosensors P1 in the first scanning unit A18. In the event of a malfunction, for example a power failure, the reference position of the first index plate S1 with respect to the housing G can be analogously reproduced by means of the above described calibration process. This is true even if the first index plate S1 cannot be moved out of its momentary position, because for example a tool that is in functional connection with the shaft W by the arm of the industrial robot is in engagement on a work piece to be processed when the trouble arises.

Because of the electric lines E1 connected with the second illuminating unit B2 and the second photo elements P2, the rotation of the second scanning unit A2 occurs for the calibration process or the reproduction process only over a swinging range that is somewhat greater than a full circle, and namely in both turning directions. The angle measuring system is connected via electric lines E2 with the evaluating unit and a current supply.

The current supply of the second scanning unit A2 can also be made instead of via electric lines E1 via slip rings (not shown). In this case the second scanning unit A2 can be rotated in both turning directions through arbitrarily many revolutions.

Instead of the single reference mark R, several reference marks can be included on the second index plate S2. Of course, in the event of multiple reference marks, individual reference marks should be coded to allow one to be distinguished from the other. Such coded reference marks are described for example in German DE-OS No. 30 39 483. The code marks are scanned by associated code mark scanning fields on the second scanning plate AP2. The use of only a single reference mark on the second index plate S2 has the advantage of an especially simple manufacture for the second index plate S2, since a single reference mark requires no coding for distinction.

As described below, the use of several reference marks on the second index plate S2 has the advantage that the second scanning unit A2 must traverse only a small angular path in the calibration process or the reproduction process in order to scan the adjacent reference mark, and namely in both turning directions. This reversing operation through a gear Z constructed as a reversing gear makes it possible, for example, to perform program controlled checks of the particular reference position between individual processing run-offs in a rapid and simple manner.

Figure 9:
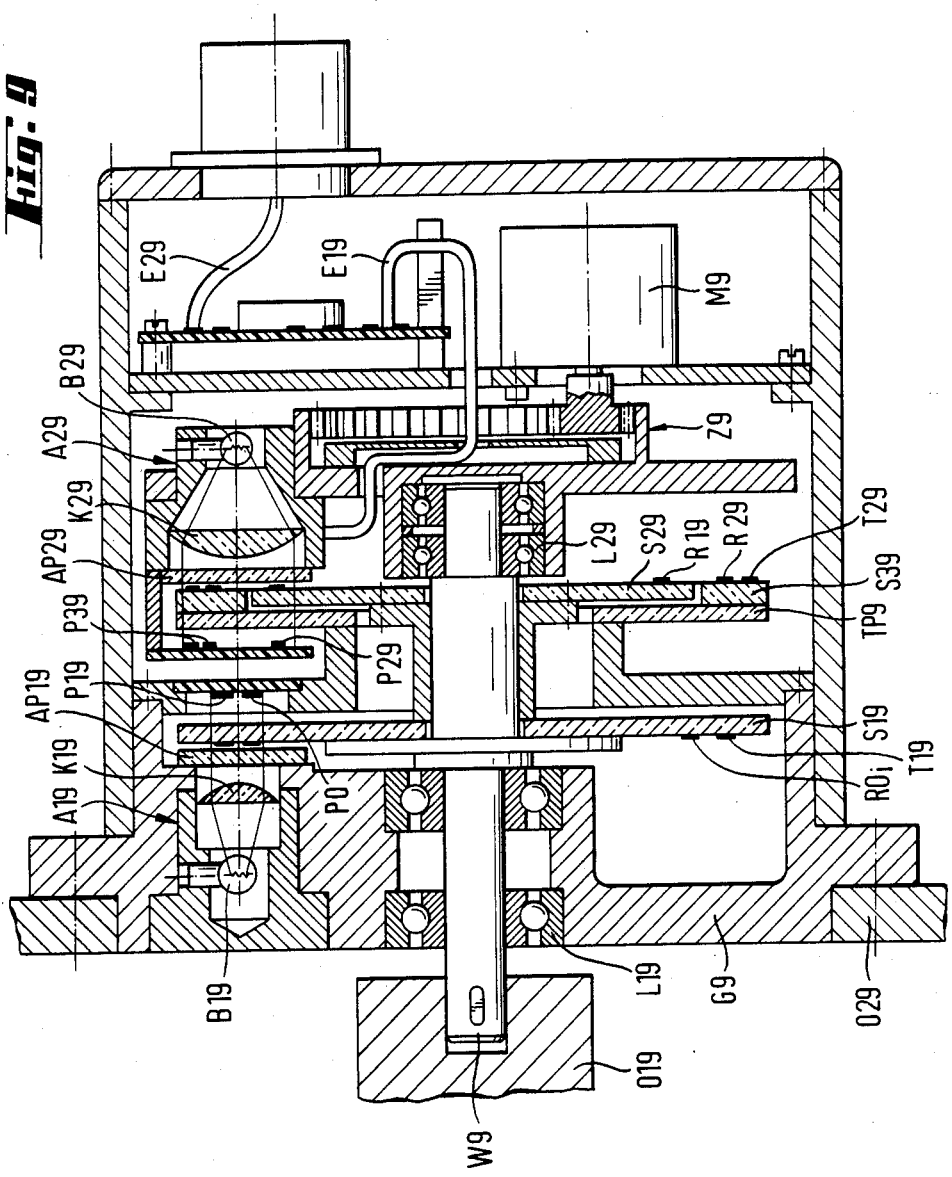
FIG. 9 is an axial sectional view of an angle measuring system which incorporates a third preferred embodiment of this invention.

FIG. 9 shows an incremental angle measuring system which incorporates yet another embodiment of this invention. The incremental angle measuring system of FIG. 9 corresponds in its basic structure and manner of operation to the measuring system of FIG. 8. In order to avoid repetition a repeated description will not be provided here. Equivalent components bear the same reference numerals with a characterizing digit "9" for the elements shown in FIG. 9.

Figure 10:
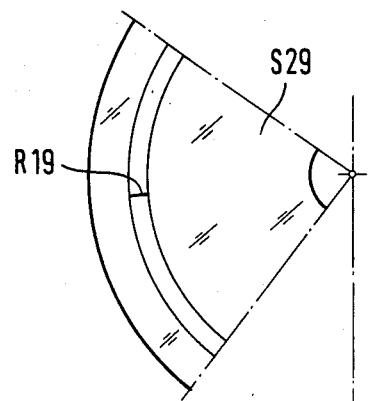
FIG. 10 is a partial view of a reference index plate.
Figure 11:
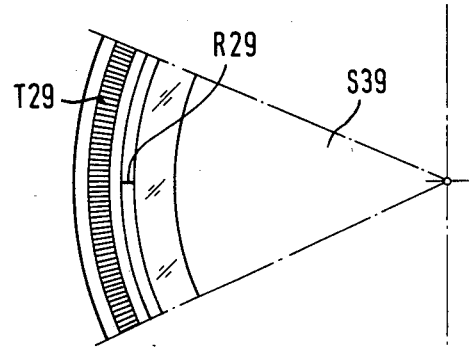
FIG. 11 is a partial view of an additional index plate.

A first index plate S19 is mounted to the shaft W9, and a second index plate S29 is mounted to the shaft W9 concentrically to the first index plate S19. The second index plate S29 defines a first reference mark R19 allocated to the first incremental graduation T19 of the first index plate S19, as shown in FIG. 10. In the plane of the second index plate S29 there is arranged on its periphery concentrically a circular annular third index plate S39 which is fastened to the housing G9 via a transparent carrier plate TP9. This third index plate S39 defines a second incremental graduation T29 and a second reference mark R29 absolutely positioned with respect to the second incremental graduation T29, as shown in FIG. 11.

The first reference mark R19 of the second index plate S29 as well as the second incremental graduation T29 and the second reference mark R29 of the third index plate S39 are likewise photoelectrically scanned by a second scanning unit A29. This second scanning unit A29 includes a second illuminating unit B29, a second condenser K29, a second scanning plate AP29, as well as a second photosensor P29 and a number of third photosensors P39. The second scanning unit A29 is mounted in the housing G9 on the shaft W9 by means of bearings L29 so as to rotate relative to the second index plate S29 and the third index plate S39.

Figure 12:
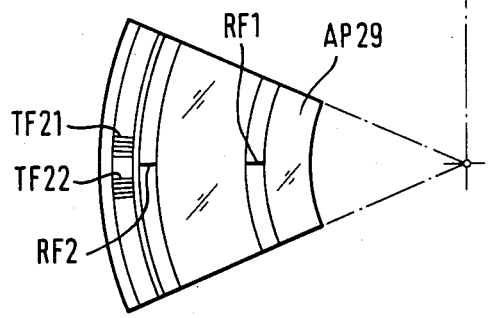
FIG. 12 is a partial view of a reference scanning plate.

Two second graduation scanning fields TF21, TF22 are provided on the second scanning plate AP29 of the second scanning unit A29 in alignment with the second incremental graduation T29 of the third index plate S39 (as shown in FIG. 12). These two second graduation scanning fields TF21, TF22 are offset with respect to one another by a quarter of the graduation period of the associated second incremental graduation T29 in order to discriminate the direction of rotation of the second scanning plate AP29. The graduations of the second graduation scanning fields TF21, TF22 correspond with the second incremental graduation T29.

The first reference mark R19 of the second index plate S29 and the second reference R29 of the third index plate S39 consist in each case of identical line groups with a predetermined irregular line distribution. A first reference mark scanning field RF1 and a second reference mark scanning field RF2 with identical line distributions are provided on the second scanning plate AP29 of the second scanning unit A29 (as shown in FIG. 12). A second photosensor P29 is allocated to the first reference mark scanning field RF1 on the second scanning plate AP29, and respective third photo elements P39 are allocated to the two second graduation scanning fields TF21, TF22 and the second reference mark scanning field RF2 in the second scanning unit A29.

As described above in connection with previous embodiments, in this measuring system the momentary position of the first index plate S19 with respect to the housing G9 must be determined in order to obtain the desired reference position. For this purpose the measuring system is operated in a calibration mode of operation in which the second scanning unit A29 is set in rotation by a motor M9 secured to the housing G9 and coupled to the second scanning unit A29 via a gear train Z9. First, for example, let the second reference mark scanning field RF2 on the second scanning plate AP29 scan the second reference mark R29 on the third index plate S39. When this happens the associated third photosensor P39 of the rotating second scanning unit A29 generates a signal that sets the counter of the evaluating unit to the value zero and simultaneously starts the counter. From this point in time onward, the periodic analog signals generated by the associated third photosensors P39 during scanning of the second incremental graduation T29 of the third index plate S39 by means of the associated second graduation scanning fields TF21, TF22 on the rotating second scanning plate AP29, are evaluated, and the counting pulses are fed to the counter.

After the counter has been started and the counting of graduation increments of the second incremental graduation T29 has commenced, the first reference mark R19 on the stationary second index plate AP29 can be scanned at any time by the associated first reference mark scanning field RF1. When this happens, a signal of the associated second photosensor P29 of the second scanning unit A29 causes the counter of the evaluating unit to be stopped. The counting value determined in this way by the counter for the shifting path of the second scanning unit A29 is indicative of the angle of rotation between the first reference mark R19 and the second reference mark R29, and is thus directly indicative of the absolute position of the first index plate S19 with respect to the housing G9. This is because the two reference marks R19, R29 directly represent the graduation zero point of the associated incremental graduations T19, T29. The second scanning unit A29 is again rotated back to its approximate original starting position and the motor M9 is brought to a halt. This completes the calibration process.

From the point in time of the scanning of the first reference mark R19 onward, the counter for the measuring process proper can again be fed by the counting pulses generated in the rotation of the first index plate S19 with respect to the housing G9. The first incremental graduation T19 is scanned by means of the two first graduation scanning fields on the first scanning plate AP19, and by means of the two associated first photosensors P19 of the first scanning unit A19. In the event of a disturbance, such as a power failure for example, the reference position for the first index plate S19 can be reproduced in an analogous manner by use of the above described calibration process. This is true even if the first index plate S19 cannot be moved out of its momentary position, because for example a tool that stands in functional connection via the arm of the industrial robot with the shaft W9 happens to be an engagement on a work piece to be processed when the disturbance arises.

When only a single first reference mark R19 on the second index plate S29 and only a single second reference R29 on the third index plate S39 are provided, the advantage of a particularly simple manufacture of the two index plates S29, S39 is obtained.

Figure 13:
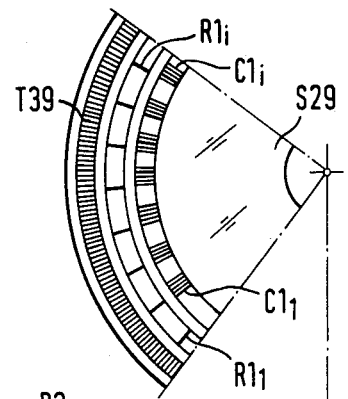
FIG. 13 is a partial view of another reference index plate.
Figure 14:
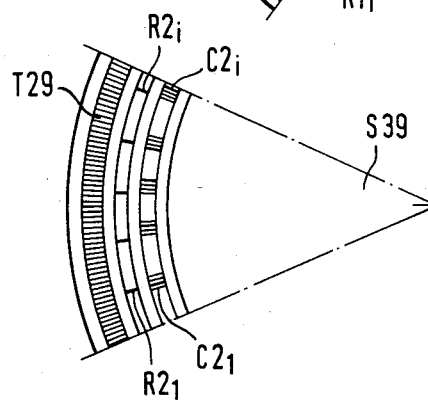
FIG. 14 is a partial view of another additional index plate.
Figure 15:
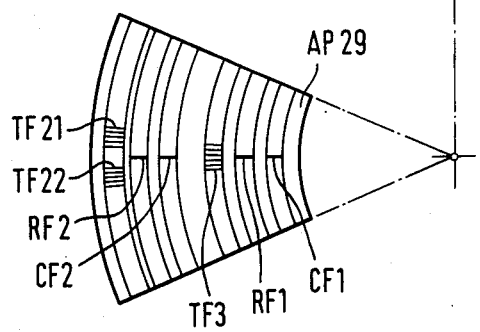
FIG. 15 is a partial view of another reference scanning plate.

The angle measuring system can also be equipped with a plurality of reference marks $R1_i$, $R2_i$. Correspondingly formed index plates are shown in FIGS. 13, 14 and 15. To the shaft W9 there is secured concentrically to the first index plate S19 a second index plate S29 with first reference marks $R1_i$ (i=1, 2, ... n), each of which is absolutely positioned with respect to the first incremental graduation T19 of the first index plate S19. A respective first code mark $C1_i$ is allocated to each reference mark in order to identify the reference mark (FIG. 13). In the plane of the second index plate S29 there is arranged concentrically on its periphery a circular annular third index plate S39, which is fastened to the housing G9 via the transparent carrier plate TP9 and which defines a second incremental graduation T29 and an array of second reference marks $R2_i$ (i=1, 2, ... n), each of which is absolutely positioned with respect to the second incremental graduation T29. For identification purposes a respective second code mark $C2_i$ is associated with each of the reference marks $R2_i$ (FIG. 14).

The first reference marks $R1_i$ and the associated first code marks $C1_i$ of the second index plate S29 as well as the second incremental graduation T29, the second reference marks $R2_i$, and the associated second code marks $C2_i$ are likewise scanned photoelectrically by the second scanning unit A29, which is formed as described above and is rotatably mounted relative both to the second index plate S29 and to the third index plate S39. The first reference marks $R1_i$ of the second index plate S29 and the second reference marks $R2_i$ of the third index plate S39 consist in each case of an identical line group with a predetermined irregular line distribution. A first reference mark scanning field RF1 and a second reference mark scanning field RF2 are provided on the second scanning plate AP29 of the second scanning unit A29 for scanning the first and second reference marks $R1_i$ and $R2_i$. Each of these reference mark scanning fields RF1, RF2 is provided with the identical line distribution of the corresponding reference mark (FIG. 15). The absolute positions of the first reference marks $R1_i$ with respect to the graduation zero point of the first incremental graduation T19 are encoded in the associated first code marks $C1_i$, and the absolute positions of the second reference marks $R2_i$ with respect to the graduation zero point of the second incremental graduation T29 are encoded in the associated second code marks $C2_i$. For example, a so-called bar code can be used in the code marks $C1_i$, $C2_i$ to encode the absolute positions of the respective reference marks $R1_i$, $R2_i$. A first code mark scanning field CF1 is provided on the second scanning plate AP29 for the first code marks $C1_i$, and a second code mark scanning field CF2 is provided on the second scanning plate AP29 for the second code marks $C2_i$. Respective second photosensors P29 are provided for the first reference mark scanning field RF1 and the first code mark scanning field CF1 on the second scanning plate AP29. Similarly, respective third photosensors P39 are provided in the scanning unit A29 for the two second graduation scanning fields TF21, TF22, the second reference mark scanning field RF2 and the second code mark scanning field CF2.

In order to determine the reference position the momentary position of the first index plate S19 must be determined with respect to the housing G9. For this purpose, as already described, a calibration mode of operation is initiated.

To obtain the reference position the first code mark scanning field CF1 on the second scanning plate AP29 is used to read the first code mark $C1_i$ belonging to the scanned first reference mark $R1_i$, thereby determining the absolute position value of the scanned first reference mark $R1_i$. In the scanning of the second reference mark $R2_i$ the corresponding second code mark $C2_i$ is simultaneously read by means of the associated second code mark scanning field CF2 on the second scanning plate AP29 in order to determine the absolute position value of the scanned second reference mark $R2_i$. These two absolute position values of the first reference mark $R1_i$ and the second reference mark $R2_i$ are applied to an evaluating unit. The absolute position value of the second reference mark $R2_i$ is superimposed on the absolute position value of the first reference mark $R1_i$ with the correct algebraic sign ($+$ or $-$), along with the counting value of the counter. This counting value corresponds to the angular spacing between the first reference mark $R1_i$ and the second reference mark $R2_i$. At this point, the evaluating unit indicates the absolute position value that the first index plate S19 momentarily occupies with respect to the housing G9. The second scanning unit A29 is again returned to its starting position and the motor M9 is stopped. This completes the calibration process.

It is possible to construct this second scanning unit A29 as two separate scanning units. In this case the transparent carrier plate TP9 can be directly incorporated as part of the third index plate S39. Thus, the circular annular third index plate S29, which is relatively difficult to manufacture, can be eliminated.

On the third index plate S39 as shown in FIG. 13 there is provided a third incremental graduation T39 which is scanned by a third graduation scanning field TF3 on the rotating second scanning plate AP29 during the calibration process or the reference position reproduction process. The analog signal obtained in this scanning by the associated second photosensor P29 of the second scanning unit A29 is logically linked with the reference signal obtained from the first reference mark $R1_i$, so that this reference signal can be improved for subsequent evaluation.

Since the first index plate S19 and the second index plate S29 cannot be mounted exactly concentrically in actual practice, eccentricity errors can occur.

Figure 16:
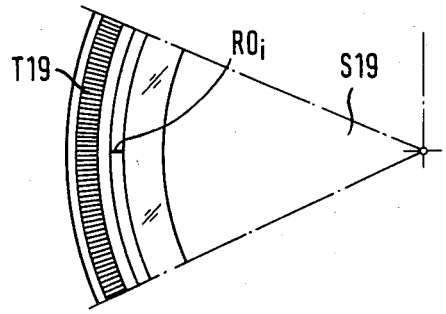
FIG. 16 is a partial view of a measuring index plate including an additional reference mark.

As shown in FIG. 16, at least one reference mark $R0_i$ is arranged on the first index plate S19 for the elimination of any eccentricity error between the first index plate S19 and the second index plate S29. The first scanning unit A19 scans this reference mark $R0_i$ in order to correct the predetermined spacing between the reference mark $R1_i$ and the further reference mark $R2_i$ for eccentricity errors.

In practice, the above described calibration is accurate to a few bits, and the inaccuracy makes itself noticeable in the last places of the measuring result in the display. This inaccuracy in general arises from eccentricity which is in practice not possible to exclude in the mounting of the first and second plates S19, S29.

The position of the first reference mark $R1_i$ with respect to the graduation zero point of the incremental graduation T19 is selected as a rule in such a way that during the calibration process the last places of the measuring result are made to appear as "0". If now the last places of the measuring result deviate from 0, then an eccentricity error is indicated.

The additional reference mark $R0_i$ provided on the first index plate S19 can be fabricated directly during the graduation production so that it actually establishes the graduation zero point without error. Advantageously there are concentrically arranged with respect to the incremental graduation T19 several additional reference marks $R0_i$. For example, in one embodiment there are seventy-two additional reference marks $R0_i$ on the index plate S19, so that one of the additional reference marks $R0_i$ appears every five angular degrees.

As soon as the index plate S19 has rotated through at most five degrees of rotation, a pulse that sets the last places of the measuring result to zero is generated by the scanning unit A19 in response to one of the reference marks $R0_i$.

As previously mentioned, when in the calibration mode the counter is again set in operation by the reference mark $R1_i$, so that the angular path of the index plate S19 is detected, which incorporates the eccentricity error. If for example, a measuring value of 51.38° was determined during the calibration process, then the position of the index plate S19 has been determined to be in error by 0.38°, since, after all, the reference mark $R1_i$ should be referred to the graduation zero point.

If now after the calibration a start is again made in counting, then at absolutely 55.00° there appears one of the reference marks $R0_i$. The display however shows the measuring value of 55.38°. At this point according to the invention the last places are set to zero and the measurement is therewith corrected for the eccentricity error.

It lies within the scope of this invention to use other zero indicators instead of the reference marks $R1_i$ and $R2_i$ during the calibration process. Furthermore, eccentricity errors are not fundamentally excluded.

Instead of photoelectric zero indicators, zero indicators working on a magnetic, capacitive, or inductive basis can also be used.

As the differing graduations illustrated in the drawings show, the invention is not restricted to use with purely incremental position measuring systems, but can also be used with mixed incremental/absolute systems.

Likewise, the physical scanning principle is not essential to the invention. Thus, magnetic, inductive, capacitive, piezoelectric, and naturally optoelectric position measuring arrangements in incident light or transmitted light versions and their combinations can be used. It is therefore intended that the foregoing detailed description be regarded as illustrative rather than limiting, and that it be understood that it is the following claims, including all equivalents, which are intended to define the scope of this invention.

We claim:

1. In a system for measuring the relative position of first and second objects movable relative to one another, of the type comprising at least one measuring graduation carrier connected to the first object, a measuring incremental graduation defined by the measuring graduation carrier, at least one measuring scanning unit connected to the second object to scan the measuring incremental graduation, and means for defining at least one reference position at a selected absolute position with respect to the measuring incremental graduation, the improvement comprising:

at least one reference scanning unit for scanning the at least one reference position, said reference scanning unit mounted to move independently of the measuring scanning unit, the first object, and the second object, said reference scanning unit comprising means for scanning the at least one reference position; and means for determining the distance between a scanned one of the reference positions and the measuring scanning unit in order to determine the absolute position of the measuring scanning unit with respect to the scanned reference position.

2. The invention of claim 1 wherein the distance determining means comprises:
a first indicator mounted on the measuring scanning unit; and
a second indicator mounted on the reference scanning unit;
said first and second indicators cooperating to form a zero indicator on coincidence.

3. The invention of claim 1 further comprising:
an additional measuring scanning unit movable independently of the measuring and reference scanning units to scan the measuring incremental graduation;
a first indicator mounted on the measuring scanning unit and included in the distance determining means;
a second indicator mounted on the reference scanning unit and included in the distance determining means;
a third indicator mounted on the additional measuring scanning unit;
said second indicator positioned to move into coincidence with both the first and third indicators at respective relative positions between the reference scanning unit and the measuring and the additional measuring scanning units;
said first and second indicators cooperating to form a first zero indicator upon coincidence therebetween;
said second and third indicators cooperating to form a second zero indicator on coincidence therebetween.

4. The invention of claim 1 further comprising: means for automatically moving the reference scanning unit with respect to the measuring incremental graduation.

5. The invention of claim 1 further comprising:
means for manually moving the reference scanning unit with respect to the measuring incremental graduation.

6. The invention of claim 1 wherein the means for defining at least one reference position comprises a reference mark absolutely positioned with respect to the measuring incremental graduation, wherein the distance determining means comprises a reference incremental graduation mounted alongside the measuring incremental graduation, and wherein the reference scanning unit comprises means for scanning the reference incremental graduation.

7. The invention of claim 1 wherein the means for defining at least one reference position comprises an absolute reference code graduation mounted alongside the measuring incremental graduation, wherein the reference code graduation defines a zero point absolutely positioned with respect to the measuring incremental graduation, and wherein the reference scanning unit comprises means for scanning the absolute reference code graduation.

8. The invention of claim 6 wherein the reference incremental graduation and the measuring incremental graduation are each disposed on a separate respective carrier.

9. The invention of claim 7 wherein the absolute reference code graduation and the measuring incremental graduation are each disposed on a separate respective carrier.

10. The invention of claim 3 wherein the means for defining at least one reference position comprises a reference graduation, wherein both the measuring incremental graduation and the reference graduation are disposed on separate respective carriers, and wherein the reference scanning unit comprises means for scanning the reference graduation.

11. The invention of claim 7 wherein the distance determining means comprises a first indicator mounted to the measuring scanning unit and a second indicator mounted to the reference scanning unit, and wherein movement between the measuring and reference scanning units brings the first and second indicators into alignment to form a zero indicator.

12. The invention of claim 1 wherein the distance determining means is operative when the first and second objects are moving relative to one another.

13. The invention of claim 6 wherein the reference incremental graduation and the reference scanning unit are adapted to perform a primary measuring function in the event of a failure of the measuring scanning unit.

14. The invention of claim 7 wherein the absolute reference code graduation and the reference scanning unit are adapted to perform a primary measuring function in the event of a failure of the measuring scanning unit.

15. The invention of claim 1 wherein the means for defining at least one reference position comprises a reference index plate, wherein the measuring graduation carrier comprises a measuring index plate; wherein the reference and measuring index plates are solidly joined together concentric with one another; wherein the reference scanning unit is mounted for concentric rotation with respect to the reference index plate; and wherein a drive unit is coupled to the reference scanning unit to rotate the reference scanning unit with respect to the reference index plate.

16. The invention of claim 15 wherein the distance determining means comprises:
an illuminating unit fixedly mounted with respect to the second object;
a photosensor fixedly mounted with respect to the second object; and
a reproducing optical system mounted to the reference scanning unit to move between the illuminating unit and the photosensor such that the reproducing optical system directs light from the illuminating unit onto the photosensor when the reference scanning unit reaches a predetermined position.

17. The invention of claim 1
(a) wherein the means for defining at least one reference position comprises a reference carrier which defines at least one first reference mark, and wherein the measuring graduation carrier is solidly joined to the reference carrier such that the first reference mark is positioned at a selected absolute position with respect to the measuring incremental graduation;

(b) wherein the distance determining means comprises a third carrier solidly mounted to the second object, said third carrier defining a reference graduation and at least one second reference mark;

(c) wherein the reference scanning unit operates to scan the first reference mark of the reference carrier and the reference graduation and the second reference mark of the third carrier; and (d) wherein the distance determining means further comprises means for registering the adjusting path of the reference scanning unit in correspondence to the distance between scanned ones of the first and second reference marks.

18. The invention of claim 17

(a) wherein the measuring graduation carrier comprises a measuring index plate, wherein the reference carrier comprises a reference index plate, and wherein the measuring and reference index plates are mounted together rigidly and concentrically;

(b) wherein the third carrier comprises an annular third index plate mounted firmly to the second object concentrically with the reference index plate; and (c) wherein the reference scanning unit is rotatably mounted, concentric to the reference and third index plates, and wherein a drive unit is coupled to the reference scanning unit to rotate the reference scanning unit relative to the reference and third index plates.

19. The invention of claim 17 wherein the distance determining means further comprises:

a plurality of first code marks, each associated with a respective one of the first reference marks; and a plurality of second code marks, each associated with a respective one of the second reference marks;

each of said first and second code marks containing in coded form information indicative of the absolute position of the respective reference mark.

20. The invention of claim 17 wherein the reference carrier defines an incremental graduation.

21. The invention of claim 17 further comprising:

at least one eccentricity reference mark disposed on the measuring graduation carrier; and means, included in the measuring scanning unit, for scanning the eccentricity reference mark to correct eccentricity errors between the measuring graduation carrier and the reference carrier.

22. The invention of claim 21 wherein the correction occurs by rounding off the last places of a measuring value.

* * * * *